United States Patent
Wunderlich et al.

(10) Patent No.: US 7,475,167 B2
(45) Date of Patent: Jan. 6, 2009

(54) OFFLOADING DATA PATH FUNCTIONS

(75) Inventors: Mark W. Wunderlich, Lake Oswego, OR (US); Hemal V. Shah, Austin, TX (US); Anshuman Thakur, Beaverton, OR (US); Daniel A. Manseau, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 11/106,799

(22) Filed: Apr. 15, 2005

(65) Prior Publication Data

US 2006/0235977 A1    Oct. 19, 2006

(51) Int. Cl.
| | |
|---|---|
| G06F 15/16 | (2006.01) |
| G06F 3/00 | (2006.01) |
| G06F 12/00 | (2006.01) |
| G06F 9/34 | (2006.01) |
| G06F 9/44 | (2006.01) |
| G06F 9/46 | (2006.01) |
| G06F 13/00 | (2006.01) |

(52) U.S. Cl. .................. 710/33; 709/227; 711/213; 719/321; 719/326
(58) Field of Classification Search .................. 710/33; 709/227; 719/321, 326; 711/213
See application file for complete search history.

(56) References Cited

U.S. PATENT DOCUMENTS

| | | | |
|---|---|---|---|
| 2003/0046330 A1* | 3/2003 | Hayes | 709/201 |
| 2003/0204631 A1* | 10/2003 | Pinkerton et al. | 709/249 |
| 2006/0015618 A1* | 1/2006 | Freimuth et al. | 709/226 |
| 2006/0031524 A1* | 2/2006 | Freimuth et al. | 709/227 |

OTHER PUBLICATIONS

Anonymous; "Method of Calculating iSCSI Data CRC32C Checksum with an iSCSI Offload Adaptor"; Jul. 17, 2002.*
Satran, et al. "ISCSI," IP Storage Working Group, Internet Draft; draft-ietf-ips-iscsi-20.txt; Jan. 19, 2003; 238 pp.

* cited by examiner

*Primary Examiner*—Niketa I Patel
*Assistant Examiner*—Tushar S Shah
(74) *Attorney, Agent, or Firm*—Konrad Raynes & Victor, LLP.

(57) ABSTRACT

Input/Output (I/O) protocol operations such as iSCSI protocol operations may be selectively offloaded to an I/O protocol offload device, or retained by a host driver software. In one embodiment, iSCSI data transfer functions are offloaded to an offload device while session and connection establishing and maintenance operations are retained by host driver software. Other features are described and claimed.

28 Claims, 8 Drawing Sheets iSCSI Protocol Data Unit (PDU)

iSCSI Header for SCSI Initiator Command iSCSI Header and Data Sections of an iSCSI Target Response PDU

OFFLOADING DATA PATH FUNCTIONS

BACKGROUND

In a networked storage environment, a network controller including a networked storage adapter or a host bus adapter (HBA) on a host computer, such as an Ethernet controller, Fibre Channel controller, etc., will receive Input/Output (I/O) requests or responses to I/O requests directed between an initiator and a target. Often, the host computer operating system includes a device driver to communicate with the network controller hardware to manage I/O requests to transmit and receive over a network. The host computer may also implement a protocol which packages data to be transmitted over the network into packets, each of which contains a destination address as well as a portion of the data to be transmitted. A transport protocol layer can process the packets received by the network controller, and accesses any I/O commands or data embedded in the packet.

For instance, the computer may implement the Transmission Control Protocol (TCP) and Internet Protocol (IP) to encode and address data for transmission, and to decode and access the payload data in the TCP/IP packets received at the network controller. IP specifies the format of packets, also called datagrams, and the addressing scheme. TCP is a higher level protocol which establishes a connection between a destination and a source.

FIG. 1 shows an example of a stack 10 of interface layers, one of which includes a "physical layer" 12 that handles bit-level transmission over physical media. A "link layer" 14 handles the low-level details of providing reliable data communication over physical connections. A "network layer" 16 implements a protocol such as the Internet Protocol, and can handle tasks involved in finding a path through a network that connects a source and destination. A "transport layer" 18 implements a transport protocol such as the TCP protocol, and coordinates communication between source and destination devices while insulating "application layer" programs from the complexity of network communication. Another interface layer 20 implements another high level protocol, the Internet Small Computer Systems Interface (iSCSI) protocol, which is designed to transport SCSI commands and data from a SCSI interface layer 22 over a network such as an IP network between an Initiator device, and a Target device.

The term "iSCSI" refers to the protocol defined and described by the IETF (Internet Engineering Task Force) standards body, and any variant of that protocol. One example of an iSCSI packet configuration comprises an Ethernet package encapsulating an Internet Protocol (IP) and Transmission Control Protocol (TCP) package layers, which further encapsulate one or more iSCSI packages or a partial iSCSI package, that includes one or more SCSI commands or other iSCSI payload. In network data transmission operations, an initiator device transmits data or commands over the network to a target device. The TCP/IP package includes error detection code such as checksum code, to determine whether the transmitted packet has changed during the transmission as the packet passes through switches and routers. Both an initiator of such an iSCSI command and the target generally can accommodate the Ethernet, TCP/IP, and iSCSI protocols when processing each part of the transmitted packet. The target device, upon receiving the packet, will use the Ethernet protocol to access the TCP/IP package, the TCP/IP protocol to access the iSCSI package, and iSCSI protocol to access the SCSI commands or data within the iSCSI package.

In a known stack such as the stack 10, the iSCSI session and the transport/network connections are managed by an iSCSI session/connection management portion 24 of the iSCSI layer 20. A SCSI command directed to an iSCSI target, may be issued by the initiator of the host computer. This initiator SCSI command is processed by a SCSI command processing portion 26 of the iSCSI layer 20.

A data transfer operation may be performed in accordance with the iSCSI protocol by the SCSI command processing portion 26, together with an iSCSI request/response processing portion 28 of the iSCSI layer 20. Commands, status information, acknowledgments, responses, requests and data including read data and write data may be encapsulated for transmission in a Protocol Data Unit (PDU), or if received, unpacked from a Protocol Data Unit, by an iSCSI PDU generation/reception processing portion 30 of the iSCSI layer 20. If errors occur during the data transfer operation, such errors may handled by an iSCSI error handling recovery portion 32 of the iSCSI layer 20.

Protocol layers such as the transport layer can be performed substantially entirely by host software such as the network controller driver, an application or the operating system. Similarly, protocol layers such as the iSCSI layer can be performed substantially entirely by host software such as a driver for a network controller often referred to as a host bus adapter, as well as an application or the operating system. However, software such as a driver for a controller, can utilize significant host processor resources to handle network transmission requests to the network controller. One technique to reduce the load on the host processor is the use of an offload engine such as an iSCSI offload engine and a TCP/IP Offload Engine (TOE) in which protocol related operations such as the iSCSI protocol and the TCP/IP protocols are implemented substantially entirely in the network controller hardware as opposed to the device driver or other host software, thereby saving the host processor from having to perform the iSCSI and TCP/IP protocol related operations. For example, each of the protocol layers 12-20 of the stack 10 may be implemented in a network controller having offload engines. In addition, to conserving host processor resources, interrupt handling by the host processor may be reduced as well.

In another approach, the offload engine may perform some but not all iSCSI protocol related tasks. For example, the Intel PRO/1000 T IP Storage Adapter, can perform error checking of an encapsulated iSCSI packet using the iSCSI error checking codes, before the iSCSI packets are forwarded elsewhere for extraction and processing of the SCSI commands or data.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments of the description provided herein. It is understood that other embodiments may be utilized and structural and operational changes may be made without departing from the scope of the present description.

Figure 2:
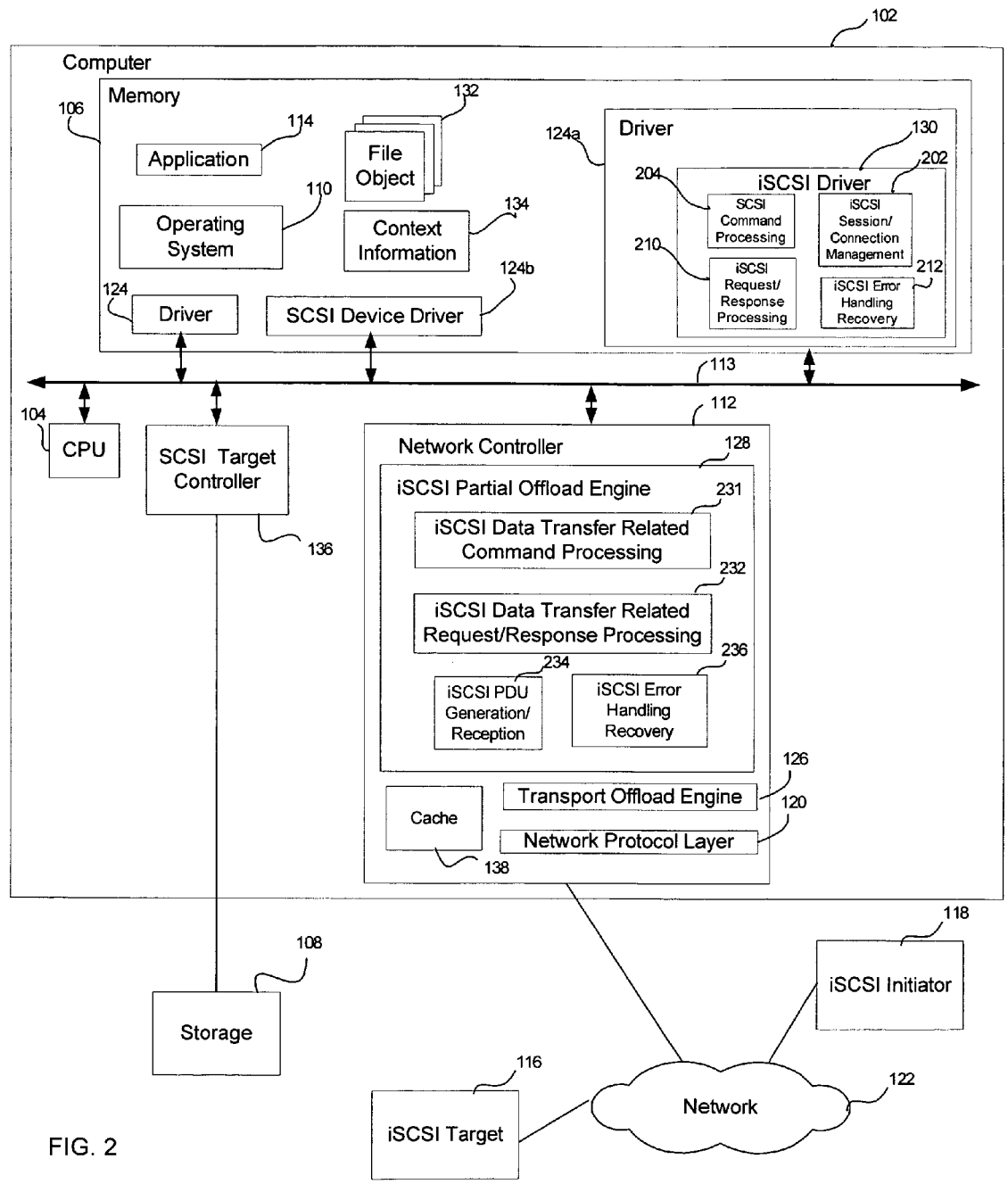
FIG. 2 illustrates one embodiment of a computing environment in which aspects of the description provided herein may be employed.

FIG. 2 illustrates a computing environment in which aspects of the description provided herein may be implemented. A computer 102 includes one or more central processing units (CPU) 104 (only one is shown), a memory 106, non-volatile storage 108, an operating system 110, and a network controller 112 coupled by a bus 113 to other hardware devices of the computer 102. An application program 114 further executes in memory 106 and is capable of transmitting to and receiving packets from a remote computer or other device, such as or an iSCSI target 116 or an iSCSI initiator 118. Typically, a remote computer is a storage server. However, the computer 102, target 116 or initiator 118 may each comprise any suitable computing device, such as a mainframe, server, personal computer, workstation, laptop, handheld computer, telephony device, network appliance, virtualization device, storage controller, network controller, etc. Any suitable CPU 104 and operating system 110 may be used. Programs and data in memory 106 may be swapped into storage 108 as part of memory management operations.

The network controller 112 includes a network protocol layer 120 to send and receive network packets to and from remote devices over a network 122. The network 122 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network controller 112 and various protocol layers may implement the Ethernet protocol (IEEE std. 802.3, published Mar. 8, 2002) over unshielded twisted pair cable, TCP/IP (Transmission Control Protocol/Internet Protocol), Remote Direct Memory Access (RDMA), token ring protocol, Fibre Channel (IETF RFC 3643, published December 2003), Infiniband, Serial Advanced Technology Attachment (SATA), parallel SCSI, serial attached SCSI cable, etc., or any other suitable networking protocol. Details on the TCP protocol are described in "Internet Engineering Task Force (IETF) Request for Comments (RFC) 793," published September 1981, details on the IP protocol are described in "Internet Engineering Task Force (IETF) Request for Comments (RFC) 791, published September 1981, and details on the RDMA protocol are described in the technology specification "Architectural Specifications for RDMA over TCP/IP" Version 1.0 (October 2003). Details on the UDP protocol are described in "Internet Engineering Task Force (IETF) Request for Comments (RFC) 798, published August, 1980. Further details on the SAS architecture for devices and expanders is described in the technology specification "Information Technology—Serial Attached SCSI (SAS)", reference no. ISO/IEC 14776-150:200x and ANSI INCITS.***:200x PHY layer (Jul. 9, 2003), published by ANSI. Details on the SATA architecture are described in the technology specification "Serial ATA: High Speed Serialized AT Attachment" Rev. 1.0A (January 2003). Details on the Infiniband protocol are described in the specification "InfiniBand Architecture, Specification Volume 1", Release 1.1, published by the InfiniBand trade association, November 2002. Details on the Internet Small Computer System Interface (iSCSI) protocol are described in (IETF RFC 3347, published February 2003.

The host software includes a plurality of drivers which execute in memory 106 as represented by a driver 124. One such driver indicated at 124a includes network controller specific commands to communicate with the network controller 112 and interface between the operating system 110, applications 114 and the network controller 112. The network controller can implement the network protocol layer 120 and can control other protocol layers including a data link layer and a physical layer which includes hardware such as a data receiver. In an embodiment, employing the Ethernet protocol, the data transceiver could be an Ethernet transceiver.

In certain implementations, the network controller 112 includes a transport protocol layer as well as the network protocol layer 120. For example, the network controller of the network controller 112 can include a TCP/IP offload engine (TOE) 126, in which transport layer operations are performed within the offload engine of the network controller 112 hardware, as opposed to the device driver 124a.

The transport protocol operations include packaging data in a TCP/IP packet with a checksum and other information and sending the packets. These sending operations are performed by an agent which may be implemented with a TOE, a network interface card or integrated circuit, a driver, TCP/IP stack, a host processor or a combination of these elements. The transport protocol operations also include receiving a TCP/IP packet from over the network and unpacking the TCP/IP packet to access the payload or data. These receiving operations are performed by an agent which, again, may be implemented with a TOE, a driver, a host processor or a combination of these elements.

The network layer 120 handles network communication and provides received TCP/IP packets to the transport protocol layer of the offload engine 126. The transport protocol layer interfaces with the device driver 124a and performs additional transport protocol layer operations, such as processing the content of messages included in the packets received at the network controller 112 that are wrapped in a transport layer, such as TCP and/or IP, the Internet Small Computer System Interface (iSCSI), Fibre Channel SCSI, parallel SCSI transport, or any suitable transport layer protocol. The transport offload engine 126 can unpack the payload from the received TCP/IP packet and transfer the data to another protocol processing layer within the network controller 112, the device driver 124a, an application 114, the operating system 110 or other destination within the system 102.

Another protocol, Remote Direct Memory Access (RDMA) establishes a higher level connection and permits, among other operations, direct placement of data at a specified memory location at the destination. In certain embodiments, the network controller 112 can further include an RDMA protocol layer as well as the transport protocol layer of the offload engine 126. For example, the network controller 112 can implement an RDMA offload engine, in which RDMA layer operations are performed within the offload engines of the RDMA protocol layer implemented within the network controller 112 hardware, as opposed to the host software driver 124a.

Thus, for example, an application 114 transmitting messages over an RDMA connection can transmit the message through the host software driver 124a and the RDMA protocol layer of the network controller 112. The data of the message can be sent to the transport protocol layer of the offload engine 126 to be packaged in a TCP/IP packet before transmitting it over the network 122 through the network protocol layer 120 and other protocol layers including the data link and physical protocol layers. In one example, the data to be transmitted may be indicated to the offload engine 126 by providing pointers to the data to be moved instead of passing the data to the engine 126. The offload engine 126 can utilize the provided pointers to pull data as needed to send over the network.

In the illustrated embodiment, the network controller 112 includes a partial iSCSI protocol layer implemented with an iSCSI partial offload engine 128. As described in greater detail below, once a session and one or more transport connections have been established and maintained by an iSCSI driver 130 of the host software driver 124a, data transfers may be offloaded to the iSCSI partial offload engine which can effectuate a data transfer independently of the iSCSI driver 130. Conversely, data transfers or other iSCSI operations may be retained by the iSCSI driver 130 and performed independently of the iSCSI partial offload engine 128. In one embodiment, the driver 124a refrains from retaining a data transfer once control of the data transfer has been offloaded to the engine 128. For example, the driver 124a may associate a mode of operation within a connection of a session which indicates whether data transfer offload is enabled for all data transfers. Once data offload is enabled, the host driver 124a may utilize data offload for all data transactions until which it becomes useful to end the data offload enabled mode. Once data transfer offload is disabled, all data transfers for the connection would be retained by the driver until data transfer offload is reenabled. It is appreciated that other approaches may be used, depending upon the particular application.

The memory 106 further includes file objects 132, which also may be referred to as socket objects, which include information on a connection to a remote computer over the network 122. The application 114 uses the information in the file object 132 to identify the connection. The application 114 may use the file object 132 to communicate with a remote system. The file object 132 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 134 comprises a data structure including information the host software driver 124a, operating system 110 or an application 114 maintains to manage requests including commands sent to the network controller 112 as described below. In the case of a TOE, this information may be shared between the host and the TOE or other offload engine. For example, context information may be passed to the offload engine 128 may maintained there until the operation is completed.

In the illustrated embodiment, the CPU 104 programmed to operate by the software of memory 106 including one or more of the operating system 110, applications 114, and host software drivers 124, provides a host which interacts with the network controller 112. Accordingly, a data send and receive agent includes an iSCSI protocol layer of the driver 124a and the partial offload engine 128 of the network controller 112, the transport protocol layer of the offload engine 126 and the network protocol layer 120 of the network interface 112. However, the data send and receive agent may be implemented with an offload engine, a network interface card or integrated circuit, a driver, iSCSI/TCP/IP stack, a host processor or a combination of these elements.

The computer 102 may include a SCSI target controller 136 which functions as a target and receives read and write commands over the network 122 from an initiator device 118, and in response, reads data from and writes data to the host memory 106 or the storage 108. The initiator 118 may be a client computer, server or storage controller, for example. In the illustrated embodiment, the read and write commands are SCSI commands encapsulated in iSCSI packets sent over the network 122 although it is appreciated that other protocols may be used as well. In the illustrated embodiment, the SCSI commands to and from the target controller 136 are encapsulated or unencapsulated by the iSCSI driver 130 or the iSCSI driver 130 in combination with the iSCSI partial offload engine of the network controller 112.

The SCSI target controller 136 may be implemented as hardware, software, firmware of any combination thereof. For example, the target controller 136 may be implemented in hardware having a processor separate from the CPU 104. Also, the target controller 136 may be implemented in software such as in the operating system 110 or in a host software driver such as a controller driver 124b operating in the memory 106. The computer 102 includes a storage controller for the storage 108, which may be implemented with the SCSI target controller 136 or may be implemented in separate hardware, software, firmware or any combination thereof.

The computer 102 may further include a SCSI initiator which sends read and write commands over the network 122 to a target such as the target device 116, for example, and in response, writes data to and reads data from the host memory 106 or the storage 108. The target 116 may be a client computer, server or storage controller, for example. In the illustrated embodiment, the read and write commands sent by the initiator of the computer 102 are SCSI commands encapsulated in iSCSI packets sent over the network 122 although it is appreciated that other protocols may be used as well. In the illustrated embodiment, the SCSI commands sent by or directed to the initiator of the computer 102 are again, encapsulated or unencapsulated by the iSCSI driver 130 or the iSCSI driver 130 in combination with the iSCSI partial offload engine of the network controller 112.

The protocol initiator of the computer 102 may be implemented as hardware, software, firmware of any combination thereof. For example, the initiator may include hardware having a processor separate from the CPU 104 and the network controller 112. Also, the initiator may include software such as software in the operating system 110 or in a host software driver such as a controller driver 124a, 124b operating in the memory 106.

Data is often stored in non-volatile storage units such as disk drives and tape units which tend to be relatively slow as compared to non-volatile memory such as random access memory (RAM). Associated with the network controller 112 is a cache 138 in which read or write data may be cached by a cache manager of the network controller 112 in anticipation of that cached data satisfying the next read or write operation from the initiator or target of the computer 102. There are a number of data caching techniques including "read-ahead" techniques in which more data than is needed to satisfy the presently pending request, is cached in the cache. In addition to caching data, the cache 134 may be used to cache state information such as iSCSI state information, for example, which identifies the state of an iSCSI data transfer. Still further, the cache 138 may cache lists of host memory locations, such as Scatter Gather lists, for example, identified by a host driver. The particular caching technique used may depend upon the application being performed. For example, in a backup operation, the data read from the storage unit tends to be read in a linear fashion. Hence, data may be cached for efficient read operations by caching data from the storage unit in sequential order.

The cache 138 may be a part of the host memory 106 or may be a separate memory coupled to or internal to the network controller 112. The cache manager of the network controller 112 may be implemented as hardware, software, firmware of any combination thereof. For example, the cache manager may be implemented in storage controller hardware and include a processor separate from the CPU 104. Also, the cache manager may be implemented in the network controller 112 or in a host software driver such as one or more of the controller drivers 124, 124a, 124b.

Figure 3A:
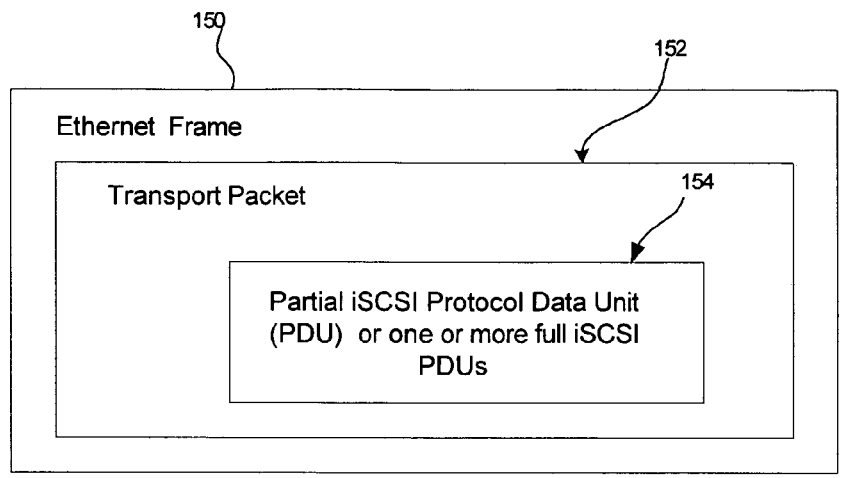
FIGS. 3a and 3b illustrate a prior art packet architecture.

FIG. 3a illustrates a format of an iSCSI network packet 150 received at or transmitted by the network controller 112. The network packet 150 is implemented in a format understood by the network protocol layer 120, such as the IP protocol. The network packet 150 may include an Ethernet frame that can include additional Ethernet components, such as a header and error checking code (not shown). A transport packet 152 is included in the network packet 150. The transport packet 152 is capable of being processed by the transport protocol layer of the offload engine 126 in accordance with the TCP protocol. The packet 152 may be processed by other layers in accordance with other protocols including Internet Small Computer System Interface (iSCSI) protocol, Fibre Channel SCSI, parallel SCSI transport, etc. The transport packet 152 includes payload data 154 as well as other transport layer fields, such as a header and an error checking code. The payload data 154 includes the underlying content being transmitted, e.g., commands, status, or data. The driver 124, 124a, 124b, target controller 136, operating system 110 or an application 114 may include a device layer, such as a SCSI driver or layer to process the content of the payload data 154 and access any status, commands and/or data therein.

Figure 3B:
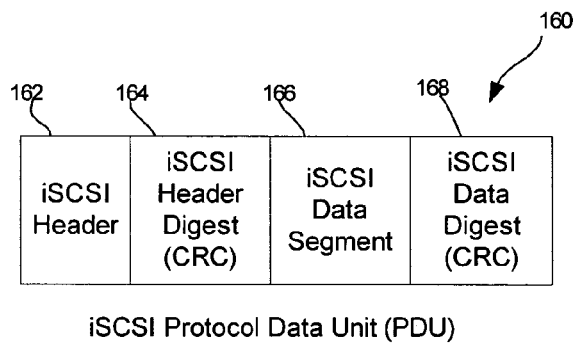

In the example of FIG. 3a, the payload data 154 of the transport packet 152 includes a partial iSCSI Protocol Data Unit or one or more complete iSCSI Protocol Data Units. Thus, an iSCSI Protocol Data Unit may be spread over more than one transport packet 152. FIG. 3b shows an example of a complete iSCSI Protocol Data Unit 160 which has an iSCSI header 162 segments; an iSCSI header digest 164 comprising a CRC code for use in error checking the iSCSI header 162 segment; an optional iSCSI data segment 166; and an optional iSCSI data digest 168 comprising a CRC code for use in error checking the iSCSI data segment 166. The iSCSI header 162 includes an opcode that indicates the type of operation being transmitted by the transmitting device. There are initiator opcodes and target opcodes.

Figure 4A:
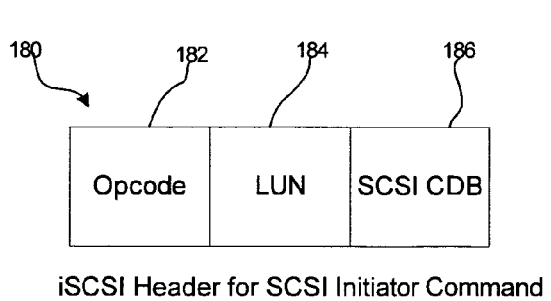
FIG. 4a illustrates a prior art iSCSI header architecture for a SCSI initiator command.

FIG. 4a illustrates fields for certain of the information included in the iSCSI header 162 when the packet 150 is transmitted by an initiator, such as the initiator 118 or the host initiator of the computer 102, and includes a SCSI command. The initiator iSCSI header 180 has an opcode field 182 for initiator opcodes and control information, a logical unit number (LUN) 184 indicating a LUN against which the SCSI command operates, and a SCSI Command Descriptor Block (CDB) 186 specifying the specific SCSI command that is to be processed by the target into a SCSI command.

In response to an iSCSI packet from an initiator 132, the iSCSI protocol layer of an iSCSI target prepares response data and status information which are packaged into iSCSI packets to be sent to the initiator. One example of such a PDU is the iSCSI Response PDU. Another example is a SCSI ready to transfer (R2T) PDU. SCSI write data from an initiator to a target may be encapsulated in a Data-out PDU. SCSI read data from a target to an initiator may be encapsulated in a Data-in PDU.

Figure 4B:
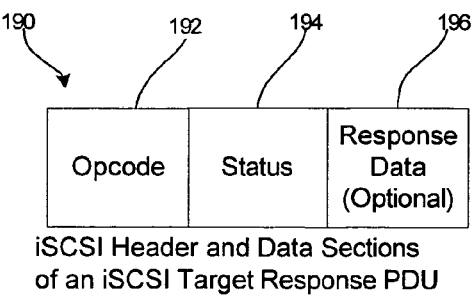
FIG. 4b illustrates a prior art iSCSI header and data section architecture for a SCSI target response.

FIG. 4b illustrates certain of the information included in the iSCSI header 162 when the packet 150 is a response transmitted by an iSCSI target, such as a host target of the computer 102 or an iSCSI target 116. The target iSCSI header 190 includes, among other things, an opcode field 192 for target opcodes and control information; a status field 194 indicating the SCSI status of the received command, e.g., good, check condition, busy, etc.; and response data 196, such as read target data to return in response to a SCSI read request. The target iSCSI header 190 including the target read data requested by the initiator are packaged in a suitable packet for transmission back to the initiator over the network 122.

Figure 5:
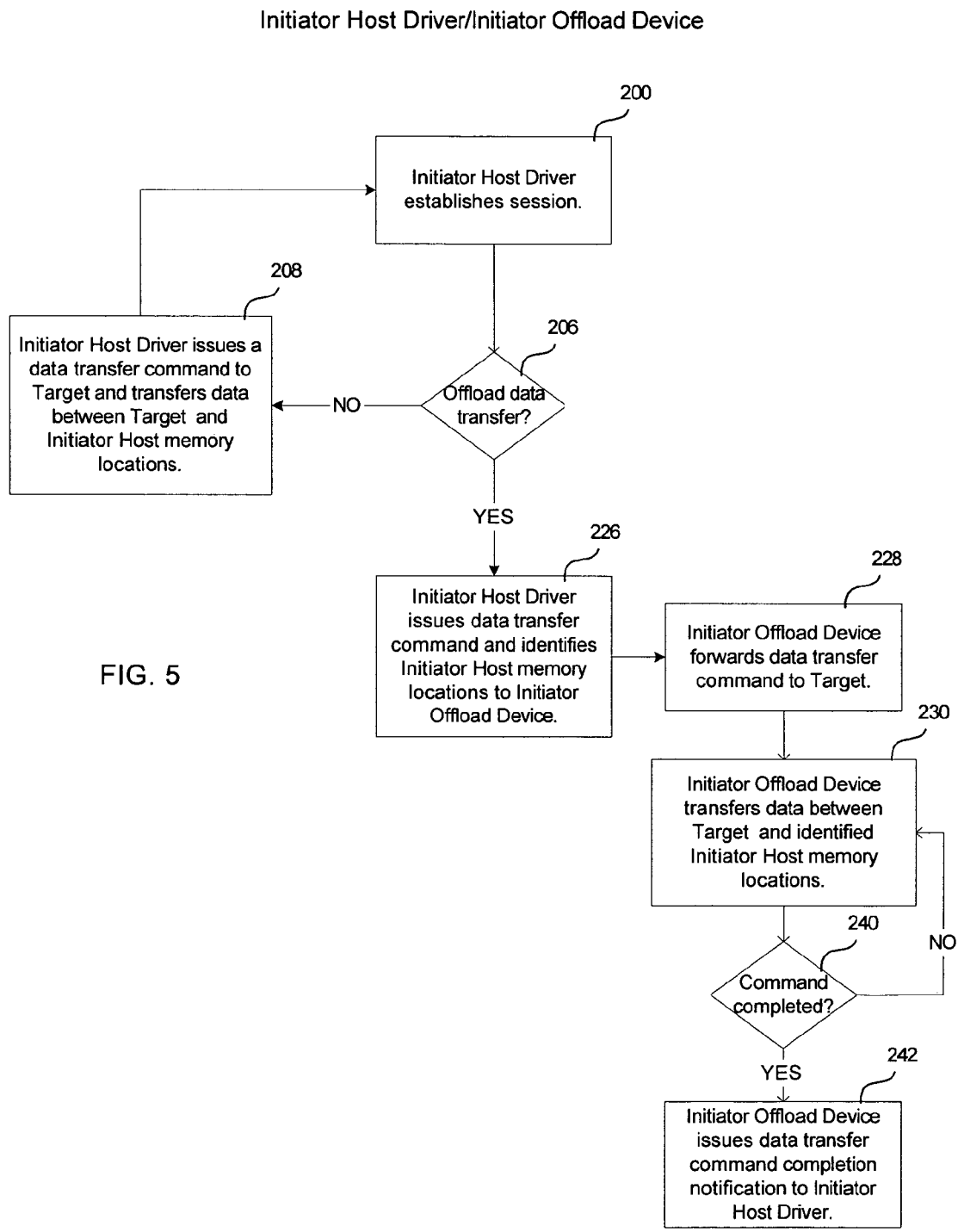
FIG. 5 illustrates one embodiment of operations performed by an initiator host software driver and an initiator partial offload device in which data may be transferred between an initiator and a target by the initiator partial offload device independently of the initiator host software driver in accordance with aspects of the present description.

In accordance with one aspect of the description provided herein, partial offloading of input/output (I/O) protocol processing, such as iSCSI protocol processing is selectively provided. FIG. 5 shows one example of logic for selectively offloading data transfer operations to an offload device, or retaining those data transfer operations for performance by the host such as host driver software. In the example of FIG. 5, iSCSI protocol processing is described. It is appreciated however, that partial offloading of I/O protocol processing in accordance with the present description may be applied to a variety of I/O protocols including RDMA, RDMAP, Infiniband Architecture (IBA), etc. Well suited protocols include credit based data exchange protocols in which a data transmission is solicited by a target. The R2T response is an example of such a data transmission solicitation or buffer granting instruction. The R2T response solicits the initiator to transmit a defined quantity of data to a defined buffer location. Details on the RDMA Verbs are described in the technology specification "RDMA Protocol Verbs Specification 1.0, (April, 2003). Details on the RDMA over TCP/IP protocol Marker Protocol Data Unit (PDU) Aligned TCP Framing Protocol (MPA) are described in "Marker PDU Aligned Framing for TCP Specification (Version 1.0)," (October, 2002). Details on the RDMA over TCP/IP protocol Direct Data Placement Protocol (DDP) are described in the "Direct Data Placement over Reliable Transports (Version 1.0)," (October, 2002). Details on the RDMA over TCP/IP protocol RDMA Protocol (RDMAP) are described in "An RDMA Protocol Specification (Version 1.0)," (October, 2002).

In one operation, an initiator host driver such as the iSCSI driver 130, establishes (block 200) a session between the host initiator of the computer 102 and a target such as the iSCSI target 116. Communication between an initiator and a target occurs over one or more TCP connections which can carry control messages, SCSI commands, parameters, and data encapsulated within iSCSI Protocol Data Units. The group of TCP connections that link an initiator with a target form a session which is identified by a session identification (SID).

TCP connections can be added and removed from a session. Each connection within a session may be identified by a connection ID (CID).

To establish and maintain a session, various messages or commands may be exchanged between an initiator and a target such as "login request," "login response," "text request," and "text response." To terminate a session, additional messages or commands may be exchanged such as "logout request," and "logout response." In the illustrated embodiment, the iSCSI session and the transport/network connections are managed by an iSCSI session/connection management portion 202 of the iSCSI driver 130 of the device driver 124a. In the negotiation of a session between an initiator and a target, the target may define a particular buffer size for unsolicited data transmissions by the initiator. The write data for an unsolicited transmission may be sent as a part of a write command, for example.

A SCSI command directed to an iSCSI target such as the iSCSI target 116, may be issued by the initiator of the host computer 102. This initiator SCSI command is processed by; in the illustrated embodiment, a SCSI command processing portion 204 of the iSCSI driver 130 of the device driver 124a.

In response to the SCSI command, the SCSI command processing portion 204 of the initiator host driver selects (block 206) whether to offload the operation which may be a data transfer operation, for example, to an offload device such as the partial offload engine 128, or to retain the operation for performance by the initiator host driver. Such data transfer operations include a data write operation such as SCSI Write, in which write data is transferred from the initiator to the target. Conversely, in a read operation such as SCSI Read, read data is transferred from the target to the initiator. Although the illustrated example depicts offloading of read or write data transfer operations for the I/O protocol, it is recognized that other types of I/O protocol processing operations may be selectively offloaded. Thus, zero or more network connections such as TCP/IP connections may be offloaded, depending on particular application.

However, it is appreciated that in one embodiment, raw protocol messages not involving substantial data transfer may be good candidates for retention by the initiator host driver rather than offloading such messages to an offload device. Thus, in the illustrated embodiment, the initiator host driver performs the iSCSI session establishment and management functions. Offloading of, for example, a TCP connection for a discovery session may be avoided. The initiator host driver has a central view of the iSCSI connection hardware including network controllers such as host bus adapters, for example. Thus, the initiator host driver may be well suited to handle, for example, connection reinstatement, session reinstatement/closure/timeout or session continuation/failure. Moreover, the initiator host driver may support iSCSI sessions spanning multiple iSCSI devices for failover and load balancing purposes, in addition to selectively offloading functions as appropriate.

If retention of the data transfer operation is selected (block 206), the initiator host driver issues (block 208) a data transfer command to the target to initiate the data transfer. Data may then be transferred (block 208) by the initiator host driver to or from the target. In the illustrated embodiment, the data transfer operation when retained by the iSCSI driver 130, is performed by the SCSI command processing portion 204, together with an iSCSI request/response processing portion 210 of the iSCSI driver 130. PDU generation or reception may be performed by a suitable iSCSI PDU generation/reception processing portion similar to the portion 30. If errors occur during the data transfer operation, such errors are handled by an iSCSI error handling recovery portion 212 of the iSCSI driver 130.

In the illustrated embodiment, the I/O protocol is the iSCSI protocol. For this protocol, the iSCSI driver 130 can encapsulate or pack the SCSI command from the host initiator of the computer 102 into an iSCSI PDU 160. The remaining layers of the stack may be implemented in hardware, software, firmware or any combination thereof. Thus, for example, a software iSCSI driver 130 can encapsulate the iSCSI PDU 160 into one or more transport packets 152, encapsulate each transport packet 152 into a network packet 150, and so on for transmission to an iSCSI target over the network 122. For each processing layer of the stack, the iSCSI driver 130 can fetch and insert the appropriate payload including data, commands, status, etc, generate the appropriate headers, compute the appropriate CRC fields and complete any remaining fields of the packets as appropriate, depending upon the particular protocol layer.

Alternatively, even though the iSCSI protocol processing is retained by the iSCSI driver 130, some or all of the stack processing functions such as the transport protocol or network protocol processing operations may be offloaded to a network controller having one or more offload engines such as a TOE. Thus, for example, a network controller may be used to encapsulate the iSCSI PDU 160 generated by the iSCSI driver 130 into one or more transport packets 152, encapsulate each transport packet 152 into a network packet 150, and so on for transmission to an iSCSI target over the network 122. If for example, the network controller 112 is used, the iSCSI offload engine 128 may be bypassed in whole or in part where the iSCSI protocol processing is retained (block 206) by the iSCSI driver 130.

As previously mentioned, a session may comprise several transport/network connections such as TCP/IP connections. Thus, an initiator host driver such as the iSCSI driver 130 may optionally conduct an iSCSI data transfer operation over one or more of the transport/network connections of the session, even if the particular transport/network connection does not pass through a network controller supporting an iSCSI offload engine such as the network controller 112.

If the initiator host driver selects (block 206) to offload an I/O protocol processing operation such as an iSCSI data transfer to an offload device such as the partial offload engine 128, the initiator host driver issues (block 226) a data transfer command to the partial offload engine 128 to initiate the data transfer to the target. For example, the offloaded operation may be a SCSI Read, SCSI Write or SCSI bidirectional operation. Included with a data write transfer command is an identification of the host memory locations, such as buffer memory locations within the host memory 106 or storage 108, which contain the write data for the data write transfer operation. Alternatively, the identified memory location may comprise the destination locations for read data to be transferred from the target in a data read transfer. It is appreciated that the identified memory locations associated with an offloaded command or other operation may be memory locations of other types of buffers.

In one embodiment, the initiator host driver can push the I/O protocol data transfer commands or memory location information to a queue maintained by the partial offload engine 128. Alternatively, the partial offload engine 128 can pull data transfer commands or memory location information from a queue maintained by the initiator host driver 130 in the host memory 106. It is appreciated that other techniques may be used for offloading commands and memory information to an offload device. Host memory locations may be in the form of Scatter Gather Lists (SGL) and portions of which may be cached in the cache 138 and prefetched in anticipation of being used next.

In response to the offloaded data transfer command from the initiator host driver, the initiator offload device forwards (block 228) the data transfer command to the target. In addition, pursuant to the offloaded data transfer command, data may be transferred (block 230) by the initiator offload device to or from the target, independently of the initiator host driver. In the illustrated embodiment, the data transfer operation when offloaded to the partial offload engine 128 is performed by the iSCSI data transfer related command processing portion 231, together with an iSCSI data transfer request/response processing portion 232, and an iSCSI PDU generation/reception processing portion 234 of the partial offload engine 128. If errors occur during the data transfer operation, such errors may be handled by an iSCSI error handling recovery portion 236 of the offload engine 128. Alternatively, errors may be handled by the host driver 130.

In the illustrated embodiment, the network controller 112 can encapsulate or pack a SCSI command, SCSI request or SCSI write data from the host initiator of the computer 102 into an iSCSI PDU 160 using the iSCSI PDU generation/reception processing portion 234 of the iSCSI Partial Offload Engine 128, encapsulate the iSCSI PDU 160 into one or more transport packets 152 using the transport offload engine 126, encapsulate each transport packet 152 into a network packet 150 using the network protocol layer 120, and so on for transmission to an iSCSI target over the network 122. For each processing layer of the stack, the network controller 112 can fetch and insert the appropriate payload including data, commands, status, etc, generate the appropriate headers, compute the appropriate CRC fields and complete any remaining fields of the packets as appropriate, depending upon the particular protocols.

An SCSI Request PDU typically carries the SCSI CDB and other SCSI arguments such as task attributes, Expected Data, Transfer Length for one or both transfer directions, and Task Tag, the command sequence number (CmdSN) and the expected status number (ExpStatSN) on the connection it is issued. All or part of the SCSI output (write) data associated with the SCSI command may be sent as part of the SCSI-Command PDU as a data segment. In the illustrated embodiment, an iSCSI initiator can maintain the following fields in a context or data structure for a SCSI command: Command attributes (including digest information); CmdSN (Command Sequence Number); ExpStatSN (Expected Status Sequence Number); Data Transfer Length; CDB (Command Descriptor Block), which contains SCSI buffer locations; LUN (Logical Unit Number); CID (Connection identifier); DataSN (Data Sequence Number) related information; First Burst Size and Max Burst Size for SCSI Writes; ITT (Initiator Task Tag); ErrorRecoveryLevel; Max PDU size; Pointer to a list of R2T contexts, where each R2T context contains: TTT (Target Transfer Tag); and Data Transfer Length for this R2T. This context or data structure may be passed by the initiator host driver to the offload device with the SCSI command. A context or data structure may also be maintained independently by the offload engine. It is appreciated that other information may be maintained in a context for a command to be offloaded.

In one embodiment, a structure referred to herein as an Operation Descriptor, may be devised which permits various types of commands, requests, data, status, etc, to be passed between a host driver and an offload device. In one aspect, the Operation Descriptor may have a common structure which is independent of the particular I/O protocol being implemented. Hence, a general data mover offload interface may be provided which is not restricted to a single I/O protocol.

For packets received over the network 122 from a target such as the iSCSI target 116, the network controller 112 can unencapsulate or unpack the transport packet 152 from the network packet 150 using the network protocol layer 120, unpack the iSCSI Protocol Data unit 160 from the transport packet 152 using the transport offload engine 126. If the packet passes the iSCSI check of the iSCSI CRC codes by the iSCSI PDU generation/reception processing portion 234 of the partial offload engine 128, the iSCSI command, response or read data is processed by the iSCSI data transfer related command processing portion 231, or the iSCSI data transfer request/response processing portion 232 of the partial offload engine 128.

These processing portions 231, 232 may translate the SCSI command PDUs, SCSI response PDUs and SCSI data-in and data-out PDUs received by the network controller 112 to SCSI commands, SCSI status, SCSI data and other SCSI information. The received SCSI data sequence may be written to the host memory locations identified by the initiator host driver for the offloaded read data transfer operation.

The initiator offload device continues to transfer (block 230) data between the target and the identified initiator host memory locations until (block 240) the offloaded data transfer command is completed. Once completed, the initiator offload device, such as the partial offload engine 128 issues (block 242) a data transfer command completion notification to the initiator host driver. In the illustrated embodiment, iSCSI protocol state information is updated and maintained by the initiator offload device as each PDU is transmitted or received in connection with the offloaded data transfer. Such state information may be cached by the cache 138.

Figure 6:
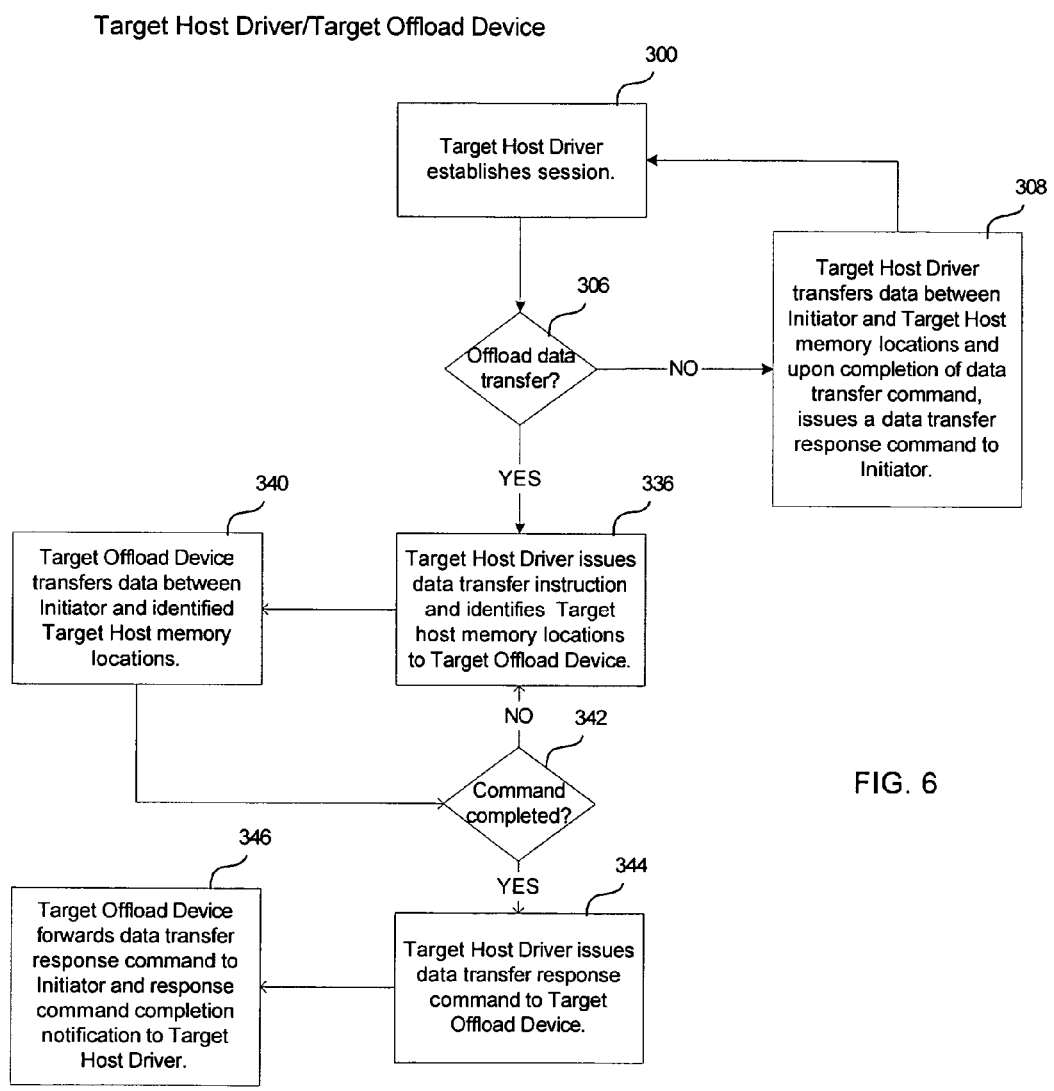
FIG. 6 illustrates one embodiment of operations performed by a target host software driver and a target partial offload device in which data may be transferred between an initiator and a target by the target partial offload device independently of the target host software driver in accordance with aspects of the present description.

FIG. 6 shows another example of logic for selectively offloading data transfer operations to an offload device, or retaining those data transfer operations for performance by the host such as host driver software. In the example of FIG. 6, iSCSI protocol processing is described for a target. It is appreciated however, that partial offloading of I/O protocol processing in accordance with the present description may be applied to a variety of I/O protocols including RDMA, RDMAP, IBA, etc, for target operations.

In one operation, a target host driver, such as the iSCSI host driver 130, establishes (block 300) a session between a target of the computer 102 and an initiator such as the iSCSI initiator 118. Thus, the iSCSI host driver 130 may operate as an initiator driver or as a target driver. As previously mentioned, communication between an initiator and a target occurs over one or more TCP connections which can carry control messages, SCSI commands, parameters, and data encapsulated within iSCSI Protocol Data Units. For a target also, the group of TCP connections that link a target with an initiator form a session which is identified by a session identification (SID). TCP connections can be added and removed from a session. Each connection within a session may be identified by a connection ID (CID).

As previously mentioned in connection with FIG. 5, to establish and maintain a session, various messages or commands may be exchanged between an initiator and a target such as "login request," "login response," "text request," and "text response." To terminate a session, additional messages or commands may be exchanged such as "logout request," and "logout response." In the illustrated embodiment, for the host target, the iSCSI session and the transport/network connections are managed by an iSCSI session/connection management portion 202 of the iSCSI driver 130 of the device driver 124a.

A target host driver, such as the iSCSI host driver 130 is notified that a command has arrived from an initiator such as the iSCSI initiator 118. The notification function may be performed by the iSCSI host driver 130 or by an offload device such as the iSCSI partial offload engine 128. In the case of the offload engine 128, the offload engine 128 may notify the iSCSI host driver 130. Thus the iSCSI partial offload engine 128 may operate as an offload engine for an initiator or for a target. This initiator iSCSI command is processed by, in the illustrated embodiment, a SCSI command processing portion 204 of the iSCSI driver 130 of the device driver 124a.

In response to the SCSI command, the SCSI command processing portion 204 of the target host driver selects (block 306) whether to offload the operation which may be a data transfer operation, for example, to an offload device such as the partial offload engine 128, or to retain the operation for performance by the target host driver. As previously mentioned, such data transfer operations may include a data write operation such as SCSI Write, in which write data is transferred from the initiator to the target. Conversely, in a read operation such as SCSI Read, read data is transferred from the target to the initiator. Although the illustrated example depicts offloading of read or write data transfer operations for the I/O protocol being processed by the target, it is recognized that other types of I/O protocol processing operations may be selectively offloaded by a target. However, it is appreciated that in one embodiment, raw protocol messages not involving substantial data transfer may be good candidates for retention by the target host driver rather than offloading such messages to an offload device.

If retention of the data transfer operation is selected (block 306), the target host driver transfers (block 308) data between the initiator and target host memory locations. Upon completion of all the data transfer pursuant to the initiator's data transfer command, the target host driver issues a data transfer response command to the initiator. In the illustrated embodiment, the data transfer operation when retained by the iSCSI driver 130, is performed by the SCSI command processing portion 204, together with the iSCSI request/response processing portion 210 of the iSCSI driver 130. PDU generation or reception may be performed by a suitable iSCSI PDU generation/reception processing portion similar to the portion 30. If errors occur during the data transfer operation, such errors are handled by an iSCSI error handling recovery portion 212 of the iSCSI driver 130.

In the illustrated embodiment, the I/O protocol is the iSCSI protocol. For this protocol, the iSCSI driver 130 can encapsulate or pack a SCSI command, SCSI response or SCSI read data from the host target of the computer 102 into an iSCSI PDU 160. The remaining layers of the stack may be implemented in hardware, software, firmware or any combination thereof. Thus, for example, a software iSCSI driver 130 can encapsulate the iSCSI PDU 160 into a transport packet 152, encapsulate the transport packet 152 into a network packet 150, and so on for transmission to an iSCSI initiator over the network 122. For each processing layer of the stack, the iSCSI driver 130 can fetch and insert the appropriate payload including data, commands, status, etc, generate the appropriate headers, compute the appropriate CRC fields and complete any remaining fields of the packets as appropriate, depending upon the particular protocol layer.

Alternatively, even though the iSCSI protocol processing is retained by the iSCSI driver 130, some or all of the stack processing functions such as the transport protocol or network protocol processing operations may be offloaded to a network controller having one or more offload engines such as a TOE. Thus, for example, a network controller may be used to encapsulate the iSCSI PDU 160 generated by the iSCSI driver 130 into a transport packet 152, encapsulate the transport packet 152 into a network packet 150, and so on for transmission to an iSCSI initiator over the network 122. If for example, the network controller 112 is used, the iSCSI offload engine 128 may be bypassed in whole or in part where the iSCSI protocol processing is retained (block 306) by the iSCSI driver 130. Thus, for example, in an iSCSI operation not involving substantial data transfer, the initiator offload device can assist the initiator host driver by generating the error checking codes such as CRCs for the outgoing PDUs and calculating the error checking codes for the incoming PDUs.

As previously mentioned, a session may comprise several transport/network connections such as TCP/IP connections. Thus, a target host driver such as the iSCSI driver 130 may optionally conduct an iSCSI data transfer operation over one or more of the transport/network connections of the session, even if the particular transport/network connection does not pass through a network controller supporting an iSCSI offload engine such as the network controller 112.

If the target host driver selects (block 306) to offload an I/O protocol processing operation such as an iSCSI data transfer to an offload device such as the partial offload engine 128, the target host driver issues (block 336) a data transfer instruction to the partial offload engine 128 to initiate the data transfer between the target and the initiator. For example, the offloaded operation may be an R2T operation. Included with a data read transfer instruction is an identification of the host memory locations, such as buffer memory locations within the host memory 106 or storage 108 of the target, which contain the data for the data transfer operation. It is appreciated that the identified memory locations associated with an offloaded command, instruction or other operation may be memory locations of other types of buffers.

In one embodiment, the target host driver can push the I/O protocol data transfer instructions or memory location information to a queue maintained by the partial offload engine 128. Alternatively, the partial offload engine 128 can pull data transfer instructions or memory location information from a queue maintained by the target host driver 130 in the host memory 106. It is appreciated that other techniques may be used for offloading commands and memory information to an offload device. Host memory locations may be in the form of Scatter Gather Lists (SGL) and portions of which may be cached in the cache 138 and prefetched in anticipation of being used next.

In response to the offloaded data transfer instruction from the target host driver, the target offload device can transfer data (block 340) to or from the initiator, independently of the target host driver. In the illustrated embodiment, the data transfer operation when offloaded to the partial offload engine 128 is performed by the iSCSI data transfer related command processing portion 231, together with an iSCSI data transfer request/response processing portion 232, and an iSCSI PDU generation/reception processing portion 234 of the partial offload engine 128. If errors occur during the data transfer operation, such errors may be handled by an iSCSI error handling recovery portion 236 of the offload engine 128. Alternatively, errors may be handled by the host driver 130

In the illustrated embodiment, the network controller 112 can encapsulate or pack a SCSI response or SCSI read data from the host target of the computer 102 into an iSCSI PDU 160 using the iSCSI PDU generation/reception processing portion 234 of the iSCSI Partial Offload Engine 128, encapsulate the iSCSI PDU 160 into one or more transport packets 152 using the transport offload engine 126, encapsulate the transport packet 152 into a network packet 150 using the network protocol layer 120, and so on for transmission to an iSCSI initiator over the network 122. For each processing layer of the stack, the network controller 112 can fetch and insert the appropriate payload including data, commands, status, etc, generate the appropriate headers, compute the appropriate CRC fields and complete any remaining fields of the packets as appropriate, depending upon the particular protocols.

For packets received over the network 122 from an initiator such as the iSCSI initiator 118, the network controller 112 can unencapsulate or unpack the transport packet 152 from the network packet 150 using the network protocol layer 120, unpack the iSCSI Protocol Data unit 160 (or portion thereof) from the transport packet 152 using the transport offload engine 126. Unpacked portions of iSCSI Protocol Data Units from several transport packets 152 may be reassembled into a complete iSCSI PDU. If the complete or reassembled iSCSI PDU passes the iSCSI check of the iSCSI CRC codes by the iSCSI PDU generation/reception processing portion 234 of the partial offload engine 128, the iSCSI command, request or write data is processed by the iSCSI data transfer related command processing portion 231, or the iSCSI data transfer request/response processing portion 232 of the partial offload engine 128.

These processing portions 231, 232 may translate the SCSI command PDU, and SCSI data-out PDUs received by the network controller 112 to SCSI commands and SCSI data sequences. The received SCSI data sequence may be written to the target host memory locations identified by the target host driver for the offloaded write data transfer operation. The target host driver may break a SCSI write command into one or more R2T requests. Each of these R2T request can be offloaded to the offload engine on an individual basis.

The target offload device continues to transfer (block 340) data between the initiator and the identified target host memory locations until (block 342) the offloaded data transfer command from the target is completed. Once completed, target host driver issues (block 344) a data transfer response command to the target offload device, such as the partial offload engine 128. In response, the target offload device forwards (block 346) a data transfer response command to the initiator and returns a data transfer command completion notification to the target host driver.

In the iSCSI protocol, the data transfer response command sent by the target to the initiator upon completion of the original SCSI command by the target, is a SCSI Response. The initiator offload logic processes the SCSI Response PDU from the target and returns SCSI status back to the initiator host driver. Thus, in one example, the I/O protocol may itself define a completion notification in the form of a response message that is generated by the target. This response may be used as the completion notification by the offload engine. Thus, in the example of the iSCSI protocol, the offload engine can handle R2T exchanges independently of the host and then ultimately just forward the iSCSI request completion message to the initiator host driver. Alternatively, if the final data exchange includes a completion indication, a request completion may be autogenerated and forwarded to the host or host driver. It is appreciated that other types of response commands may be issued by the target, depending upon the particular I/O protocol. In the illustrated embodiment, iSCSI protocol state information is updated and maintained by the target offload device as each PDU is transmitted or received in connection with the offloaded data transfer. Such state information may be cached by the cache 138.

Figure 7:
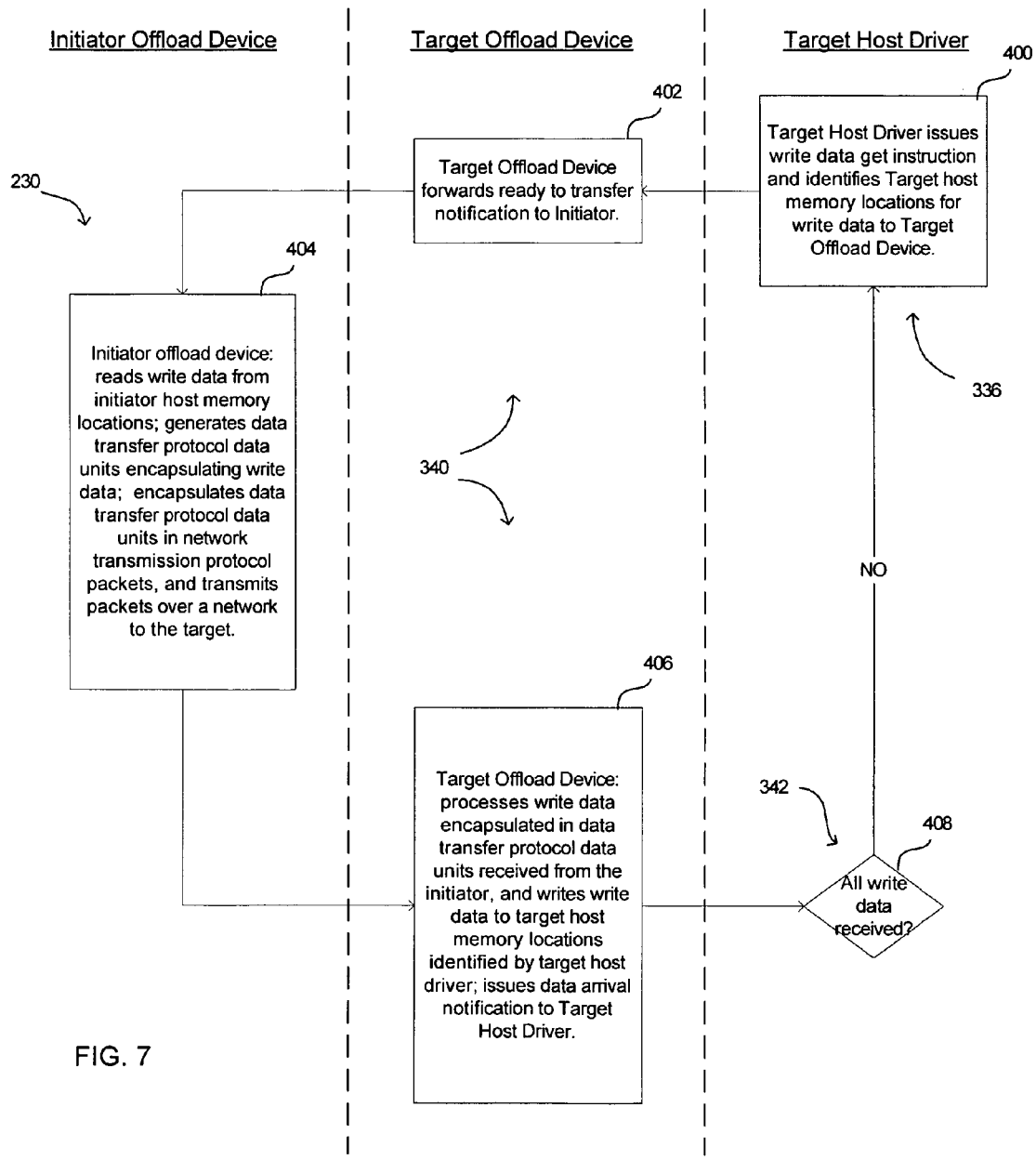
FIG. 7 illustrates one embodiment of operations performed by an initiator partial offload device and a target offload device in which write data may be transferred by the initiator partial offload device to the target partial offload device in accordance with aspects of the present description.

FIG. 7 shows an example of operations of an initiator offload device and a target offload device in greater detail in which a write operation has been offloaded both by an initiator such as the iSCSI initiator 118 and by a target such as the iSCSI target 116. In this example, the iSCSI initiator 118 and the iSCSI target 116 each has a computer architecture similar to the architecture of the computer 102.

As previously mentioned in connection with FIG. 6, if the initiator has transmitted to the target an iSCSI write command, and if the target host driver selects (block 306) to offload the iSCSI write command to an offload device such as the partial offload engine 128, the target host driver issues (block 336) a data transfer instruction to the partial offload engine 128 to initiate the write data transfer from the initiator to the target. Included with a write data transfer instruction is an identification of the target host memory locations, such as buffer memory locations within the target host memory 106 or storage 108, to which the write data from the initiator is to be written. FIG. 7 depicts the target host driver operation of block 336 in greater detail in block 400 for an iSCSI write operation. More specifically, the target host driver 130 of the target 116 issues (block 400) a write data get instruction to a target offload device such as the target offload engine 128 of the target 116. In addition, the target host driver 130 identifies target host memory locations for write data destinations to the target offload device.

In response to the offloaded write data get instruction from the target host driver, the target offload device can transfer data (block 340, FIG. 6) to the target, independently of the target host driver. More specifically, the target offload device forwards (402) a ready to transfer notification to the initiator. In the iSCSI I/O protocol, a ready to transfer (R2T) request is the mechanism by which the target grants the initiator buffers to receive the output data. The R2T PDU specifies to the initiator the offset of the requested data relative to the buffer address from the execute command procedure call and the length of the solicited data. To help the target associate the resulting Data-out PDUs with a particular R2T request, the R2T PDU carries a Target Transfer Tag (TTT) that will be copied by the initiator in the solicited Data-out PDUs carrying the write data. There are generally no protocol specific requirements with regard to the value of these tags, but it is assumed that together with the LUN, they will enable the target to associate write or other data with an R2T request.

The R2T request can carry information to facilitate operation of the iSCSI protocol, such as: R2TSN (ready to transfer sequence number) to enable an initiator to detect a missing R2T; StatSN (Status Sequence Number), a Sequence Number that the target iSCSI layer generates per connection and that in turn, enables the initiator to acknowledge status reception; ExpCmdSN (Next Expected Command Sequence Number), a sequence number that the target iSCSI, returns to the initiator to acknowledge command reception; MaxCmdSN (Maximum Command Sequence Number) a sequence number that the target iSCSI returns to the initiator to indicate the maximum command sequence number that the initiator can send. In the illustrated embodiment, the iSCSI target can maintain the following fields in a context or data structure for the R2T response: R2TSN (ready to transfer sequence number); CID (Connection identifier); ITT (Initiator Task Tag), a task tag assigned by the initiator for each task issued by the initiator; TTT (Target Task Tag) a task tag assigned by the target for each task issued by the target; data transfer length, the length of the amount of data being transferred pursuant to a command; ErrorRecoveryLevel, the associated error recovery capability; Max PDU size; Digest Information, which is error checking code information; R2T buffer locations, that is, host memory locations for write data destinations, for example. It is appreciated that other information may be stored in a context for an iSCSI request or response such as R2T.

In response to the R2T PDU from the target offload device, data may be transferred (block 230, FIG. 5) by the initiator offload device to the target independently of the initiator host driver. More specifically, as shown in FIG. 7, the initiator offload device reads (block 404) write data from initiator host memory locations. These buffer locations may be identified, by the command context passed to the initiator offload device by the initiator host driver. In addition, the initiator offload device generates data transfer protocol data units encapsulating write data. In the illustrated embodiment, the write data is encapsulated in Data-out PDUs. The initiator offload device encapsulates data transfer protocol data units in network transmission protocol packets such as TCP/IP packets, for example, and transmits the packets over a network to the target.

In the illustrated embodiment, the quantity of packets transmitted by the initiator offload device is sized so that the encapsulated write data fits within the target host memory locations identified by the write data get command. In other words, the initiator offload device may limit the quantity of Data-out PDUs such that the capacity of the target memory locations identified by the R2T is not exceeded. In this manner, the write data of the data write command is split by the initiator offload device into quantities which will fit into the associated target host memory locations associated with each ready to transfer R2T command from the target.

Upon receipt of the write data packets from the initiator offload device, the target offload device processes (block 406) the write data encapsulated in data transfer protocol data units received from the initiator offload device. In the illustrated embodiment, the target offload device unpacks the write data from the Data-out PDUs received from the initiator offload device, and writes the unpacked write data to target host memory locations as identified by the context associated with the R2T issued by the target offload device. Once all write data requested by the R2T has been received, the target offload device issues a data arrival notification to target host driver.

In response, the target host driver makes a determination (block 408) as to whether all the write data identified by the write command from the initiator has been received by the target. If not, the target host driver 130 of the target 116 issues (block 400) another write data get instruction to the target offload device and identifies additional target host memory locations for write data destinations to the target offload device (block 408). Thus, additional R2T requests are issued by the target until all the write data identified by the write command has been received.

Figure 8:
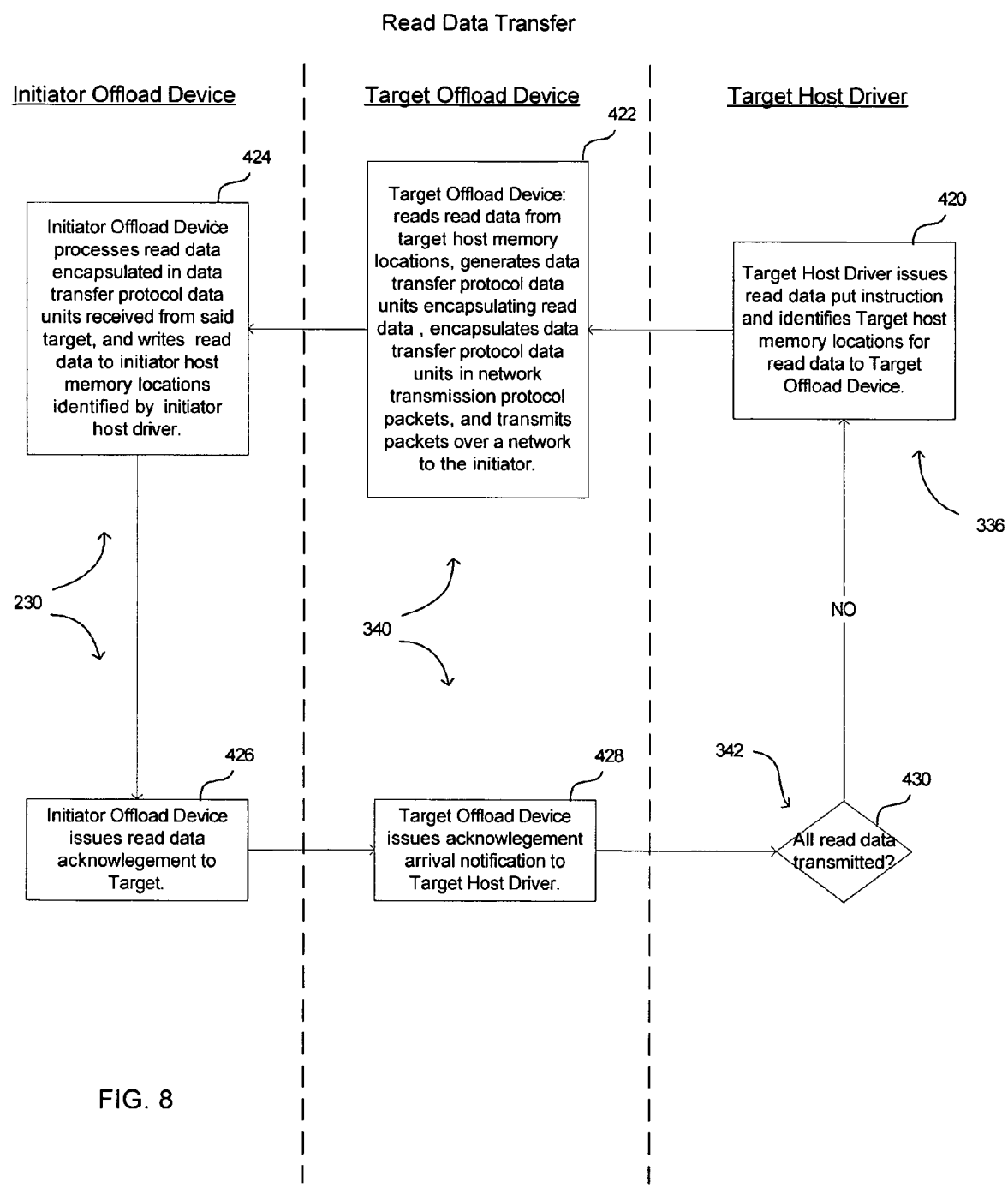
FIG. 8 illustrates one embodiment of operations performed by an initiator partial offload device and a target offload device in which read data may be transferred by the target partial offload device to the initiator partial offload device in accordance with aspects of the present description.

FIG. 8 shows an example of operations of an initiator offload device and a target offload device in greater detail in which a SCSI read operation has been offloaded both by an initiator such as the iSCSI initiator 118, and by a target such as the iSCSI target 116. Again, in this example, the iSCSI initiator 118 and the iSCSI target 116 each has a computer architecture similar to the architecture of the computer 102.

As previously mentioned in connection with FIG. 6, if the initiator has transmitted to the target an iSCSI read command, and if the target host driver selects (block 306) to offload the iSCSI read command to an offload device such as the partial offload engine 128, the target host driver issues (block 336) a data transfer instruction to the partial offload engine 128 to initiate the read data transfer from the target to the initiator. Included with a read data transfer instruction is an identification of the host memory locations, such as buffer memory locations within the host memory 106 or storage 108 of the target, from which the read data is to be transferred to the initiator. FIG. 8 depicts the target host driver operation of block 336 in greater detail in block 420 for an iSCSI read operation. More specifically, the target host driver 130 of the target 116 issues (block 420) a read data put instruction to a target offload device such as the target offload engine 128 of the target 116. In addition, the target host driver 130 identifies target host memory locations for read data sources to the target offload device.

In response to the offloaded read data put instruction from the target host driver, the target offload device can transfer data (block 340, FIG. 6) to the initiator, independently of the target host driver. More specifically, as shown in FIG. 8, the target offload device reads (block 422) read data from target host memory locations. These buffer locations may be identified by a context passed to the target offload device with the read data put instruction by the initiator host driver. This context may be similar to the R2T context.

In addition, the target offload device generates data transfer protocol data units encapsulating read data. In the illustrated embodiment, the read data is encapsulated in Data-in PDUs. The target offload device encapsulates data transfer protocol data units in network transmission protocol packets such as TCP/IP packets, for example, and transmits the packets over a network to the initiator.

Upon receipt of the read data packets from the target offload device, the initiator offload device processes (block 424) the read data encapsulated in data transfer protocol data units received from the target. In the illustrated embodiment, the initiator offload device unpacks the read data from the Data-in PDUs received from the target offload device, and writes the unpacked read data to initiator host memory locations as identified by the context associated with the read command offloaded by the initiator host driver.

As data is received or missed, the initiator offload device may issue (block 426) an appropriate acknowledgment to the target. In the illustrated embodiment, the initiator can request retransmission of numbered-responses or data from the target using a SNACK (Selective Negative Acknowledgment—also Sequence Number Acknowledgement for data). A single SNACK request can cover a contiguous set of missing items, called a run, of a given type of items. The type is indicated in a type field in the SNACK PDU header. The run is composed of an initial item (such as StatSN, DataSN, or R2TSN, for example) and the number of missed Status, Data, or R2T PDUs. For long data-in sequences, the target may request (at predefined minimum intervals) a positive acknowledgement for the data sent. A SNACK request with a type field that indicates ACK and the number of Data-In PDUs acknowledged conveys this positive acknowledgement.

Once all the read data requested by the read data put instruction has been sent by the target offload device and acknowledged as appropriate by the initiator offload device, the target offload device issues (block 428) an acknowledgment arrival notification to the target host driver. In response, the target host driver makes a determination (block 430) as to whether all the read data identified by the SCSI read command from the initiator has been sent by the target. If not, the target host driver 130 of the target 116 issues (block 420) another read data put instruction to the target offload device and identifies additional target host memory locations for read data sources to the target offload device until (block 430) all the read data identified by the SCSI read command has been successfully transmitted to the initiator.

In addition to data transfer functions, it is appreciated that error handling functions can also be offloaded to an I/O protocol processing offload device. For example, on the initiator, when an initiator offload device receives PDUs such as a R2T PDU, Data-in PDU, or a Response PDU, with a data digest error, it may be handled in various ways. In one approach, the initiator offload device can discard the erroneous PDU and generate an appropriate acknowledgment such as a SNACK request which requests the retransmission of the discarded iSCSI PDU. Another approach for the initiator offload device is to pass the iSCSI PDU with the data digest error indication to the initiator host driver and let the host driver handle the error recovery actions.

On the target, when a target offload device receives PDUs such as a Data-out PDU, or a command PDU, with a data digest error, it may also be handled in various ways. In one approach, the target offload device can send a notification such as a Reject PDU with data-digest-error information to the initiator and discard the erroneous PDU. If the discarded PDU is a Data-out PDU, the target offload device can generate a recovery R2T to request the retransmission of the discarded Data-out PDU. Another approach for the target offload device is to pass the iSCSI PDU with the data digest error indication to the target host driver and let the host driver handle the error recovery actions.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible storage medium, where such tangible storage medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The transmission medium in which the code or logic is encoded may comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention. Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself In the described embodiments, various protocol layers and operations of those protocol layers were described. The operations of each of the various protocol layers may be implemented in hardware, firmware, drivers, operating systems, applications or other software, in whole or in part, alone or in various combinations thereof.

In the described embodiments, the packets are transmitted to or from a remote computer over a network. In alternative embodiments, the transmitted and received packets processed by the protocol layers may be transmitted to a separate process executing in the same computer in which the protocol layers execute. In such embodiments, the network controller is not used as the packets are passed between processes within the same computer and/or operating system.

In certain implementations, the host software driver and network controller embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network controller embodiments may be included in a system that does not include a storage controller, such as certain hubs and switches.

In certain implementations, the host software driver and network controller embodiments may be implemented in a computer system including a video controller to render information to display on a monitor coupled to the computer system including the host software driver and network controller, such as a computer system comprising a desktop, workstation, server, mainframe, laptop, handheld computer, etc. Alternatively, the network controller and host software driver embodiments may be implemented in a computing device that does not include a video controller, such as a switch, router, etc.

In certain implementations, the network controller may be configured to transmit data across a cable connected to a port on the network controller. Alternatively, the network controller embodiments may be configured to transmit data over a wireless network or connection, such as wireless LAN, Bluetooth, etc.

The illustrated logic of FIGS. 5-8 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 1:
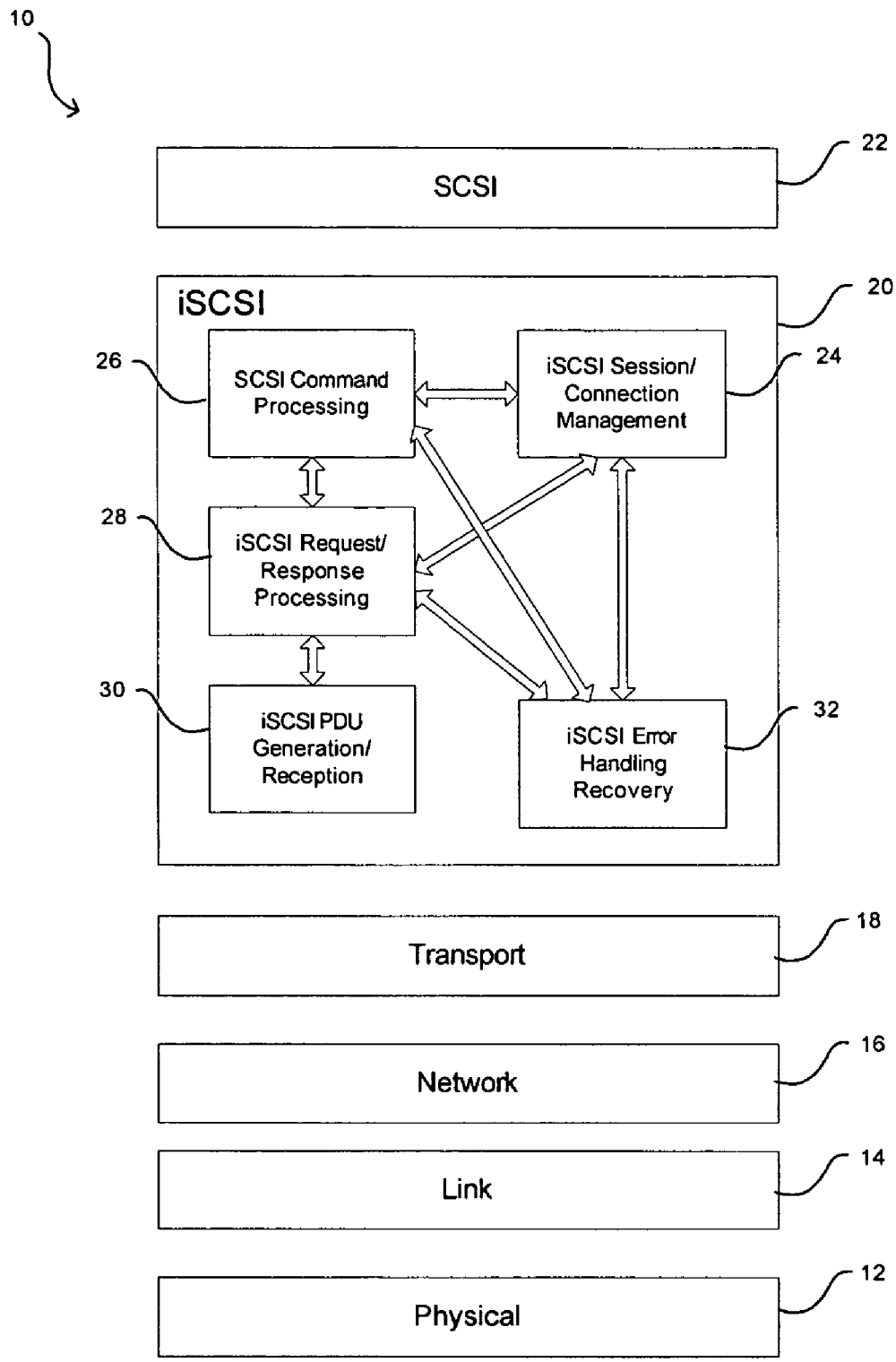
FIG. 1 illustrates a prior art stack of processing layers including an iSCSI processing layer.
Figure 9:
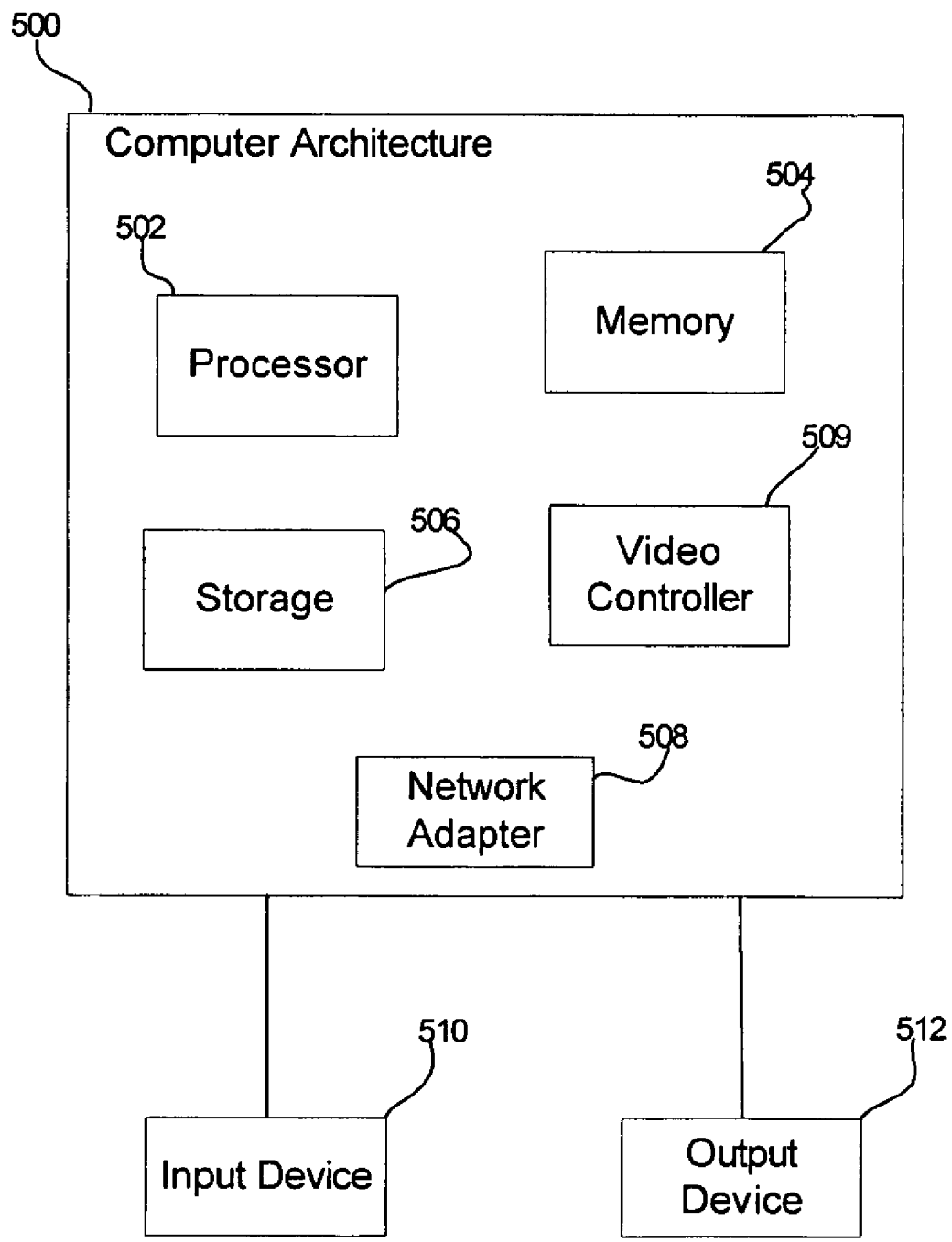
FIG. 9 illustrates an architecture that may be used with described embodiments.

FIG. 9 illustrates one implementation of a computer architecture 500 of the network components, such as the hosts and storage devices shown in FIG. 1. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a suitable manner. The architecture further includes a network controller 508 to enable communication with a network, such as an Ethernet, a Fibre Channel Arbitrated Loop, etc. Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple network cards or controllers. An input device 510 is used to provide user input to the processor 502, and may include a keyboard, mouse, pen-stylus, microphone, touch sensitive display screen, or any other suitable activation or input mechanism. An output device 512 is capable of rendering information transmitted from the processor 502, or other component, such as a display monitor, printer, storage, etc.

The network controller 508 may be implemented on a network card, such as a Peripheral Component Interconnect (PCI) card or some other I/O card, or on integrated circuit components mounted on the motherboard. Although a controller in accordance with the present description has been described as being used in connection a system providing at least one of an initiator and a target, it is anticipated that such a controller may also be used in a system which does not function as an initiator or a target but instead functions as a relay which accepts packets from a network and forwards the packets to an initiator or target over the network.

The foregoing description of various embodiments has been presented for the purposes of illustration. It is not intended to be exhaustive or to limit to the precise form disclosed. Many modifications and variations are possible in light of the above teaching.

What is claimed is:

1. A method of transferring data between an initiator and a target in accordance with an Input/Output (I/O) protocol, comprising:
   a host software driver for an offload device of the initiator establishing and maintaining a session between the initiator and the target wherein the session comprises one or more transport connections;
   said initiator host software driver selectively issuing a data transfer command of said I/O protocol for said target to said initiator offload device and identifying to said initiator offload device host memory locations for data to be transferred in connection with said data transfer command;
   said initiator offload device forwarding said data transfer command to said target;
   said initiator offload device transferring data between said target and said identified initiator host memory locations independently of said initiator host software driver wherein said initiator offload device transferring data between said target and said identified initiator host memory locations includes said initiator offload device reading write data from said initiator host memory locations, generating a data transfer protocol data unit encapsulating said write data, further encapsulating said data transfer protocol data unit generated by said initiator offload device in one or more network transmission protocol packets, and transmitting said packets over a network to said target; and processing read data encapsulated in data transfer protocol data units received from said target, and writing said read data to host memory locations identified by said initiator host software driver; and
   upon completion of said data transfer command, said initiator offload device issuing a data transfer command completion notification to said initiator host software driver.

2. The method of claim 1, further comprising:
   a host software driver for an offload device of the target establishing and maintaining said session between the initiator and the target;
   said target offload device issuing a data transfer command arrival notification to said target host software driver upon receipt of said data transfer command from said initiator offload device;
   said target host software driver selectively issuing a data transfer instruction to said target offload device and identifying to said target offload device target host memory locations for data to be transferred in connection with said data transfer instruction;
   said target offload device transferring data between said initiator and said identified target host memory locations independently of said target host driver;
   upon completion of said data transfer command, said target host software driver issuing a data transfer response command to said target offload device;
   said target offload device forwarding a data transfer response command to said initiator offload device; and
   said target offload device issuing a data transfer response command completion notification to said target host driver.

3. The method of claim 1 wherein said initiator host software driver session establishing and maintaining includes generating a data transfer protocol data unit encapsulating a message selected from the group of login request, login response, logout request, logout response, text request, text response, Small Computer System Interface (SCSI) response wherein said SCSI response includes status information; and
   wherein said initiator offload device further encapsulates a data transfer protocol data unit generated by said initiator host software driver in one or more network transmission protocol packets, and transmits said packets over a network to said target.

4. The method of claim 3 wherein said initiator offload device forwarding said data transfer command to said target includes said initiator offload device generating a data transfer protocol data unit encapsulating a SCSI command which encapsulates a SCSI Command Descriptor Block, and further encapsulating said data transfer protocol data unit generated by said initiator offload device in one or more network transmission protocol packets, and transmitting said packets over a network to said target.

5. The method of claim 2 wherein said target offload device transferring data between said initiator and said identified target host memory locations includes said target offload device reading read data from said target host memory locations, generating a data transfer protocol data unit encapsulating said read data, further encapsulating said data transfer protocol data unit generated by said target offload device in one or more network transmission protocol packets, and transmitting said packets over a network to said initiator; and processing write data encapsulated in data transfer protocol data units received from said initiator, and writing said write data to host memory locations identified by said target host driver.

6. The method of claim 5 wherein said data transfer command issued by said initiator host software driver is a data write command, said data transfer instruction issued by said target host software driver is a write data get command to said initiator in response to said data write command wherein said write data get command identifies to said initiator a portion of the initiator host memory locations of said data write command, and issuing a data arrival notification to said target host software driver upon completion of said write data get command, and wherein said target host software driver issues an additional write data get command with associated additional identified initiator host memory locations until all the write data of the data write command is received by the target.

7. The method of claim 6 wherein said initiator offload device transmits a quantity of packets over said network to said target in response to receipt of a write data get command from said target independently of said initiator host software driver, and wherein said quantity of packets is sized so that the encapsulated write data fits within said target host memory locations of said write data get command, wherein the write data of the data write command is split by the initiator offload device into quantities which will fit into the associated target host memory locations associated with the various write data get commands from the target and wherein said initiator offload device issuing a data transfer command completion notification to said initiator host software driver includes said initiator offload device issuing a data write command completion notification to said initiator host software driver in response to receipt of a data transfer response command from said target.

8. The method of claim 1 further comprising said initiator offload device checking data transfer protocol data units received from the target for transmission errors, discarding received data transfer protocol data units determined to contain a transmission error and notifying the target of the discarded data transfer protocol data units from the target.

9. The method of claim 5 further comprising said target offload device checking data transfer protocol data units received from the initiator for transmission errors, discarding received data transfer protocol data units determined to contain a transmission error and notifying the initiator of the discarded data transfer protocol data units from the initiator.

10. The method of claim 1 wherein a session maintained by the host software driver of the initiator comprises a transport connection between the initiator and a target independent of the initiator offload device; said method further comprising:
said initiator host software driver selectively issuing a data transfer command to said target; and
said initiator host software driver transferring data between said target and initiator host memory locations independently of said initiator offload device.

11. The method of claim 10 wherein a session maintained by the host software driver of the target comprises a transport connection between an initiator and the target independent of the target offload device; said method further comprising:
said target host software driver selectively issuing a data transfer instruction to said initiator in response to a data transfer command from an initiator;
said target host software driver transferring data between an initiator and target host memory locations independently of said target offload device; and
upon completion of a data transfer command, said target host software driver issuing a data transfer response command to said initiator.

12. The method of claim 1 wherein an offload device prefetches data from a host memory and stores the prefetched data in a cache memory of the offload device.

13. An article comprising a storage medium having a plurality of machine accessible instructions, wherein when the instructions are executed by devices including a host processor and an offload device, the instructions provide for:
an initiator host processor establishing and maintaining a session between an initiator and a target in accordance with an I/O protocol wherein the session comprises one or more transport connections;
said initiator host processor selectively issuing a data transfer command of said I/O protocol for said target to an offload device of said initiator and identifying to said initiator offload device host memory locations for data to be transferred in connection with said data transfer command;
said initiator offload device forwarding said data transfer command to said target;
said initiator offload device transferring data between said target and said identified initiator host memory locations independently of said initiator host processor wherein said initiator offload device transferring data between said target and said identified initiator host memory locations includes said initiator offload device reading write data from said initiator host memory locations, generating a data transfer protocol data unit encapsulating said write data, further encapsulating said data transfer protocol data unit generated by said initiator offload device in one or more network transmission protocol packets, and transmitting said packets over a network to said target; and processing read data encapsulated in data transfer protocol data units received from said target, and writing said read data to host memory locations identified by said initiator host driver; and
upon completion of said data transfer command, said initiator offload device issuing a data transfer command completion notification to said initiator host processor.

14. The article of claim 13, wherein the instructions further provide for:
a host processor of the target establishing and maintaining said session between the initiator and the target;
an offload device of said target issuing a data transfer command arrival notification to said target host processor upon receipt of said data transfer command from said initiator offload device;

said target host processor selectively issuing a data transfer instruction to said target offload device and identifying to said target offload device target host memory locations for data to be transferred in connection with said data transfer instruction;

said target offload device transferring data between said initiator and said identified target host memory locations independently of said target host processor;

upon completion of said data transfer command, said target host processor issuing a data transfer response command to said target offload device;

said target offload device forwarding a data transfer response command to said initiator offload device; and said target offload device issuing a data transfer response command completion notification to said target host processor.

15. The article of claim 13 wherein the instructions providing for said initiator host processor session establishing and maintaining include instructions further providing for generating a data transfer protocol data unit encapsulating a message selected from the group of login request, login response, logout request, logout response, text request, text response, Small Computer System Interface (SCSI) response wherein said SCSI response includes status information; and wherein the instructions further provide for said initiator offload device encapsulating a data transfer protocol data unit generated by said initiator host processor in one or more network transmission protocol packets, and transmitting said packets over a network to said target.

16. The article of claim 15 wherein the instructions providing for said initiator offload device forwarding said data transfer command to said target includes instructions providing for said initiator offload device generating a data transfer protocol data unit encapsulating a SCSI command which encapsulates a SCSI Command Descriptor Block, and further encapsulating said data transfer protocol data unit generated by said initiator offload device in one or more network transmission protocol packets, and transmitting said packets over a network to said target.

17. The article of claim 14 wherein the instructions providing for said target offload device transferring data between said initiator and said identified target host memory locations include instructions providing for said target offload device reading read data from said target host memory locations, generating a data transfer protocol data unit encapsulating said read data, further encapsulating said data transfer protocol data unit generated by said target offload device in one or more network transmission protocol packets, and transmitting said packets over a network to said initiator; and processing write data encapsulated in data transfer protocol data units received from said initiator, and writing said write data to host memory locations identified by said target host processor.

18. The article of claim 17 wherein said data transfer command issued by said initiator host processor is a data write command, said data transfer instruction issued by said target host processor is a write data get command to said initiator in response to said data write command, wherein said write data get command identifies to said initiator a portion of the initiator host memory locations of said data write command, and wherein the instructions further provide for issuing a data arrival notification to said target host processor upon completion of said write data get command, and wherein said target host processor issues an additional write data get command with associated additional identified initiator host memory locations until all the write data of the data write command is received by the target.

19. The article of claim 18 wherein the instructions further provide for said initiator offload device transmitting a quantity of packets over said network to said target in response to receipt of a write data get command from said target independently of said initiator host processor, and wherein said quantity of packets is sized so that the encapsulated write data fits within said target host memory locations of said write data get command, wherein the write data of the data write command is split by the initiator offload device into quantities which will fit into the associated target host memory locations associated with the various write data get commands from the target and wherein the instructions providing for said initiator offload device issuing a data transfer command completion notification to said initiator host processor include instructions providing for said initiator offload device issuing a data write command completion notification to said initiator host processor in response to receipt of a data transfer response command from said target.

20. The article of claim 13 wherein the instructions further provide for said initiator offload device checking data transfer protocol data units received from the target for transmission errors, discarding received data transfer protocol data units determined to contain a transmission error and notifying the target of the discarded data transfer protocol data units from the target.

21. The article of claim 17 wherein the instructions further provide for said target offload device checking data transfer protocol data units received from the initiator for transmission errors, discarding received data transfer protocol data units determined to contain a transmission error and notifying the initiator of the discarded data transfer protocol data units from the initiator.

22. The article of claim 13 wherein a session maintained by the host processor of the initiator comprises a transport connection between the initiator and a target independent of the initiator offload device; wherein the instructions further provide for:

said initiator host processor selectively issuing a data transfer command to said target; and said initiator host processor transferring data between said target and initiator host memory locations independently of said initiator offload device.

23. The article of claim 22 wherein a session maintained by the host processor of the target comprises a transport connection between an initiator and the target independent of the target offload device; and wherein the instructions further provide for:

said target host processor selectively issuing a data transfer instruction to said initiator in response to a data transfer command from an initiator;

said target host processor transferring data between an initiator and target host memory locations independently of said target offload device; and upon completion of a data transfer command, said target host processor issuing a data transfer response command to said initiator.

24. The article of claim 13 wherein the instructions further provide for an offload device prefetching data from a host memory and storing the prefetched data in a cache memory of the offload device.

25. A system for use with a network and a target coupled to the network, comprising:

an initiator having at least one host memory which includes an operating system and host memory locations, a host processor coupled to the memory, a controller for managing operations in accordance with an Input/Output (I/O) protocol, said controller including at least one offload device, and a device driver executable by the processor in the memory and adapted to:

establish and maintain a session between said initiator and a target in accordance with said I/O protocol wherein the session comprises one or more transport connections; and selectively issue a data transfer command of said I/O protocol for said target to said offload device of said initiator and identifying to said initiator offload device host memory locations for data to be transferred in connection with said data transfer command;

wherein said initiator offload device is adapted to forward said data transfer command to said target; and to transfer data between said target and said identified initiator host memory locations independently of said initiator host processor wherein said initiator offload device transferring data between said target and said identified initiator host memory locations includes said initiator offload device reading write data from said initiator host memory locations, generating a data transfer protocol data unit encapsulating said write data, further encapsulating said data transfer protocol data unit generated by said initiator offload device in one or more network transmission protocol packets, and transmitting said packets over a network to said target; and processing read data encapsulated in data transfer protocol data units received from said target, and writing said read data to host memory locations identified by said initiator host driver; and upon completion of said data transfer command, issue a data transfer command completion notification to said initiator host processor.

26. The system of claim 25 wherein said initiator host processor session establishing and maintaining includes generating a data transfer protocol data unit encapsulating a message selected from the group of login request, login response, logout request, logout response, text request, text response, Small Computer System Interface (SCSI) response wherein said SCSI response includes status information; and wherein the said initiator offload device is further adapted to encapsulate a data transfer protocol data unit generated by said initiator host processor in one or more network transmission protocol packets, and transmit said packets over a network to said target; and wherein said initiator offload device forwarding said data transfer command to said target includes said initiator offload device generating a data transfer protocol data unit encapsulating a SCSI command which encapsulates a SCSI Command Descriptor Block, and further encapsulating said SCSI command data transfer protocol data unit generated by said initiator offload device in one or more network transmission protocol packets, and transmitting said packets over a network to said target.

27. A controller for use in network having an initiator and in a system which functions as a target in accordance with an I/O protocol wherein said target includes a host software driver and a host memory, said controller comprising:

a target offload device adapted to:

in response to a data transfer instruction from said target host software driver to said target offload device, which instruction identifies to said target offload device target host memory locations for data to be transferred in connection with said data transfer instruction, transfer data between said initiator and said identified target host memory locations independently of said target host driver wherein said target offload device transferring data between said initiator and said identified target host memory locations includes said target offload device reading read data from said target host memory locations, generating a data transfer protocol data unit encapsulating said read data, further encapsulating said data transfer protocol data unit generated by said target offload device in one or more network transmission protocol packets, and transmitting said packets over a network to said initiator; and processing write data encapsulated in data transfer protocol data units received from said initiator, and writing said write data to host memory locations identified by said target host software driver;

and upon completion of said data transfer command, and in response to a data transfer response command to said target offload device, forward a data transfer response command to said initiator; and issue a data transfer response command completion notification to said target host driver.

28. The controller of claim 27 wherein said data transfer instruction issued by said target host software driver is a write data get command to said initiator in response to said data write command wherein said write data get command identifies to said initiator a portion of the initiator host memory locations of said data write command, and issuing a data arrival notification to said target host software driver upon completion of said write data get command, and wherein said target host software driver issues an additional write data get command with associated additional identified initiator host memory locations until all the write data of the data write command is received by the target.

* * * * *

UNITED STATES PATENT AND TRADEMARK OFFICE
CERTIFICATE OF CORRECTION

| | | |
|---|---|---|
| PATENT NO. | : 7,475,167 B2 | Page 1 of 1 |
| APPLICATION NO. | : 11/106799 | |
| DATED | : January 6, 2009 | |
| INVENTOR(S) | : Wunderlich et al. | |

It is certified that error appears in the above-identified patent and that said Letters Patent is hereby corrected as shown below:

In The Claims

Column 28, line 34, "host driver" should read --host software driver--.

Signed and Sealed this
Eleventh Day of November, 2014

Michelle K. Lee
*Deputy Director of the United States Patent and Trademark Office*